2,423,416

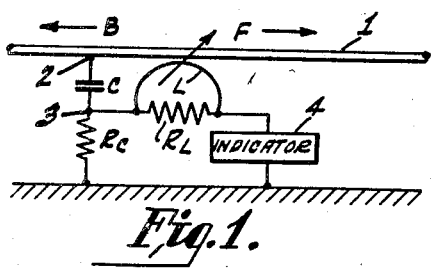
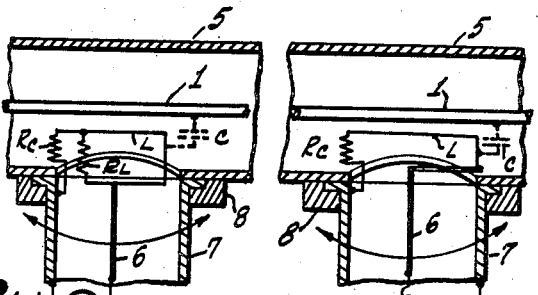
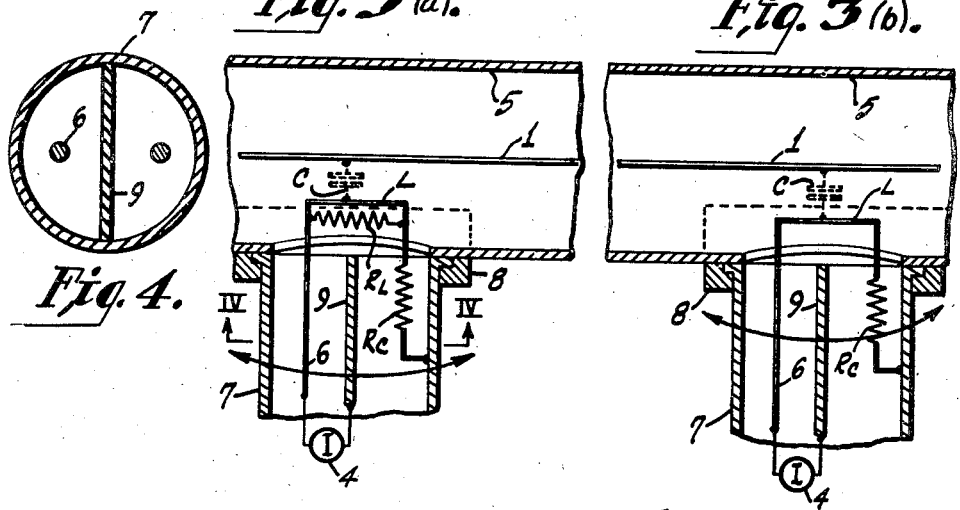
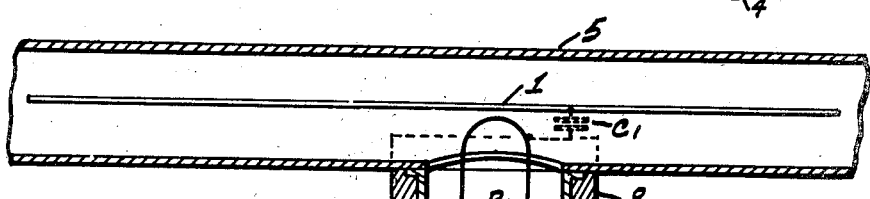
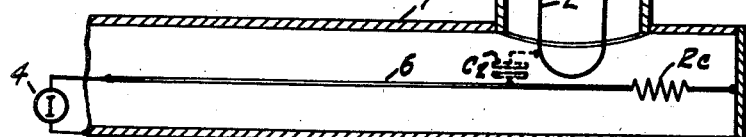
INVENTORS.
CARL G. SONTHEIMER
& NATHANIEL I. KORMAN
BY
ATTORNEY Patented July 1, 1947

UNITED STATES PATENT OFFICE 2,423,416

NONFREQUENCY-SELECTIVE REFLECTOMETER

Carl G. Sontheimer, Haddonfield, and Nathaniel I. Korman, Camden, N. J., assignors to Radio Corporation of America, a corporation of Delaware Application March 30, 1944, Serial No. 528,786

17 Claims. (Cl. 171—95)

This invention relates generally to high frequency wave transmission and more particularly to substantially non-frequency selective reflectometers for measuring directly the magnitudes of traveling waves in high frequency transmission lines and waveguides.

One of the most useful measurements customarily made on transmission lines or waveguides is the measurement of the standing wave ratio. The same information obtainable from standing wave ratio measurements may be obtained by measuring separately the forward and backward traveling wave magnitudes. Ordinarily, measurements of the standing wave ratio require the use of a movable probe in order to determine the wave magnitude at various predetermined points along the transmission line. Movable elements in ultra-high frequency coaxial transmission lines and waveguides involve difficulties due to imperfect electrical contact between the transmission line and the movable probe element which may introduce considerable error in the standing wave measurements. Furthermore, standing wave ratio measurements heretofore have necessitated a series of at least two consecutive measurements of wave magnitude at different points along the transmission line.

Heretofore, attempts to measure separately the magnitudes of the forward and backward traveling waves without the necessity of the adjustment of a probe element have been limited to measurements at a single frequency.

The instant invention permits separate measurements of the magnitudes of forward and backward traveling waves in a transmission line or waveguide without the limitation of frequency selectively in the measuring apparatus. It is an improvement over the device disclosed and claimed in applicants' copending U. S. application, Serial No. 528,785 filed March 30, 1944, wherein an energy transmission waveguide is coupled continuously, for a distance of one half to several wavelengths, through narrow slots between said transmission waveguide and two reflectometer waveguides. One of the reflectometer waveguides includes wave detecting means responsive only to forward traveling waves. The remaining reflectometer waveguide includes wave detecting means responsive only to backward traveling waves.

The invention also is an improvement over the copending U. S. application of Nathaniel I. Korman, Serial No. 528,655, filed March 29, 1944, wherein two separate lumped coupling devices polarized in opposite sense are coupled to separate wave detectors which indicate the relative magnitudes of the forward and backward traveling waves on a transmission coaxial line or waveguide.

One limitation of the devices described in both of said copending applications is that the wave detecting reflectometers either must be substantially perfectly terminated by means of a substantially non-reflecting load resistor, or the wave detectors must provide such a substantially non-reflective, perfectly matched termination.

The various embodiments of the invention to be described hereinafter include wave energy coupling means which are rotatable in a bearing on the outer conductor of a coaxial transmission line or waveguide to detect and measure alternately or separately the forward and backward traveling waves on the line.

Among the objects of the invention are to provide an improved method of and means for measuring standing waves on a high-frequency transmission line. Another object of the invention is to provide an improved method of and means for measuring separately the forward and backward traveling waves on a high-frequency transmission circuit. Another object of the invention is to provide an improved reflectometer for measuring the magnitudes of standing waves on a coaxial transmission line.

Other objects of the invention include improved methods of and means for measuring forward and backward traveling waves on a high-frequency transmission line by employing longitudinally fixed energy pickup means for said measurements. Another object of the invention is to provide an improved method of and means for measuring standing waves on a high-frequency transmission system wherein said measurements are substantially independent of the frequency of said standing waves. A further object of the invention is to provide an improved method of and means for measuring standing waves on a high-frequency transmission line wherein the measuring apparatus is substantially reactive. Another object is to provide an improved method of and means for measuring standing waves on a high frequency transmission line wherein the measurement accuracy is substantially independent of the impedance of the wave detecting means.

The invention will be described in greater detail by reference to the accompanying drawings of which Figure 1 is a schematic circuit diagram illustrating the basic theory of the invention, Figure 2(a) is a cross-sectional elevational view of a preferred embodiment of the invention applied to coaxial transmission lines, Figure 2(b) is a first modification of said preferred embodiment of the invention, Figure 3(a) is a second modification of said preferred embodiment of the invention, Figure 3(b) is a third modification of said preferred embodiment of the invention, Figure 4 is a cross-sectional view of a portion of Figure 3 taken along the section lines IV—IV, Figure 5 is a second embodiment of the invention, and Figure 6 is a third embodiment of the invention.

The fundamental principles of the invention may be described by reference to Figure 1 of the drawing wherein, for purpose of illustration, a transmission line is assumed to consist of a single conductor 1 at some predetermined distance above ground. However it should be understood that the same principles as described hereinafter may be applied in any manner known in the art, to coaxial or waveguide transmission systems.

The reflectometer is assumed to be located at the point 2 on the line. At this point, the line voltage and current are assumed to be E, I, respectively. The forward-traveling wave on the line, representing the wave traveling from the generator to the load, is indicated by the arrow pointing from left to right and is assumed to have a voltage magnitude F. Similarly, the backward-traveling wave on said line, representing the wave traveling from the load to the generator, is indicated by the arrow pointing from right to left, and the magnitude thereof is represented by B. The reflectometer comprises an inductive element L having a mutual inductance M with respect to the transmission line conductor 1. The capacitance between the transmission line conductor 1 and the inductor L is indicated by the capacitor C connected between the line conductor 1 and one end of the inductor L. The common terminals 3 of the capacitor C and inductor L are connected to ground through a resistor $R_c$. An indicator 4 is connected between the remaining terminal of the inductor L and ground. The indicator 4 may comprise any conventional type of wave detector such, for example, as a diode rectifier or crystal detector, having a conventional direct current indicating meter connected therewith. If desired, the meter circuit may include amplification to increase the sensitivity thereof.

It will be seen that $$E = F + B \text{ and } I = \frac{1}{Z_0}(F - B)$$

where $Z_0$ is the surge impedance of the transmission line.

The voltage at the junction 3 between C and $R_c$ is (1) $\quad V_c = E \dfrac{R_c}{R_c + \dfrac{1}{j\omega C}} = \dfrac{j\omega C R_c}{j\omega C R_c + 1}(F + B)$ The series voltage induced by L in the line current is (2) $\quad V_L' = j\omega M I = \dfrac{j\omega M}{Z_0}(F - B)$ Where M is the mutual inductance between L and the transmission line conductor 1.

The voltage developed by $V_L'$ across $R_L$ is (3) $\quad V_L = \dfrac{R_L}{R_L + j\omega L}V_L' = \dfrac{j\omega M}{Z_0}\dfrac{1}{1 + \dfrac{j\omega L}{R_L}}(F - B)$ Consequently the potential difference between ground and point 2 is (4) $\quad V = j\omega\left[\dfrac{CR_c}{j\omega CR_c + 1} + \dfrac{M}{Z_0}\dfrac{1}{1 + \dfrac{j\omega L}{R_L}}\right]F + j\omega\left[\dfrac{CR_c}{j\omega CR_c + 1} - \dfrac{M}{Z_0}\dfrac{1}{1 + \dfrac{j\omega L}{R_L}}\right]B$ If the two conditions (5) $\quad CR_c = \dfrac{M}{Z_0} = \dfrac{L}{R_L}$ are satisfied, then the coefficient of B in (4) vanishes and V becomes (6) $\quad V = 2j\omega\dfrac{CR_c}{j\omega CR_c + 1}F$ Equation 6 shows that if conditions (5) are met, the output of the reflectometer is proportional only to F, the magnitude of the wave traveling to the right on the line, independently of frequency.

If at the point 2 on the line is placed a second reflectometer differing from the first only in that the mutual inductance between the inductive element L and the line conductor 1 is −M, it will be seen that when the conditions of Equations 5 are satisfied that $$V = 2j\omega\dfrac{CR_c}{1 + j\omega CR_c}B$$

It will be seen that in principle, the instant invention differs from known systems for high-frequency power and wave magnitude measurements in that it simultaneously incorporates all of the following desirable features. First, the device provides measurements which are not directly dependent upon frequency. Second, all transfer impedances are reactive. Third, the accuracy of the system is independent of the wave detector impedance. Fourth, accurate measurements may be made at frequencies substantially higher than are practicable with other known systems. Fifth, due to the elimination of moving probes, measurement accuracy is substantially increased in the centimeter wave range.

In Figure 2(a), the invention is applied to the measurement of standing waves on a coaxial transmission line comprising an inner conductor 1 and an outer concentric conductor 5. A second coaxial transmission line comprising an inner conductor 6 and a concentrically disposed outer conductor 7 is coupled at right angles to the first coaxial line 1, 5, by means of a bearing 8 connecting the outer line conductors 5, 7 respectively, and permitting rotation of the second line 6, 7 with respect to the first line 1, 5.

The assembly comprising the coupling inductor L, the shunt-connected resistor $R_L$, and the resistor $R_c$ may conveniently be secured to the inner wall of the outer conductor 7 of the second transmission line. $R_L$ and $R_c$ may comprise graphite resistors, and the coupling inductor L may consist of a substantially rigid flat strip of metal formed into a rectangular loop, as shown in the drawing, and connected between one terminal of the resistor $R_c$ and the inner conductor 6 of the second line 6, 7. The value of the resistor $R_c$ may, for example, be within the range of 1 to 100 ohms. Since the coupling assembly is rigidly secured to the conductors of the second coaxial line 6, 7, the resistor $R_c$ and inductor L are serially-connected between the outer conductor 7 and the inner conductor 6 of the second coaxial line, and the resistor $R_L$ is connected in parallel with the coupling inductor L.

Since the second coaxial line 6, 7 may be rotated within the bearing 8 with respect to the first transmission line 1, 5, the mutual coupling between the coupling inductor L and the inner conductor 1 of the first transmission line 1, 5 may be varied continuously from $+M$ to $-M$ depending upon the orientation of the coupling unit. However, if desired, the rotational adjustment of the device may be limited to provide only for initial adjustment, as described hereinafter, and separate, oppositely-phased reflectometers may be employed for measuring separately and independently the forward and backward traveling waves on the transmission line. The stray capacitance between the inner conductor 1 of the first transmission line 1, 5, and the coupling inductor L is represented by the capacitor C shown in dash lines. The indicator 4 is connected between the inner and outer conductors of the second coaxial transmission line 6, 7 at the end thereof remote from the first transmission line 1, 5.

It will be seen that the measurements of the magnitudes of the forward and backward traveling waves on the first transmission line 1, 5 may be made separately by rotating the second transmission line 6, 7 within the bearing 8 and noting the readings upon the indicator 4 for the oppositely-phased positions of the coupling inductor L.

For low frequency measurements, or where very high measurement accuracy is unnecessary, the resistor $R_L$ may be omitted as shown in Figure 2(b). Otherwise, the operation and theory of the device of Figure 2(b) is identical with that described for the device of Figure 2(a).

For initial adjustment, a generator, not shown, having an internal impedance $Z_0$ (equal to the surge impedance of the first transmission line 1, 5) is connected across the first line 1, 5 which may be terminated at the remote end by means of an adjustable short-circuiting plug, not shown. The reflectometer, comprising the second transmission line 6, 7, coupling inductor L and the resistors $R_c$ and $R_L$, then may be rotated within the bearing 8 until the output indication upon the indicator 4 remains invariant to the position of the short-circuiting line plug. The adjustment thus obtained satisfies the above defined condition for correct operation (namely, $M = CR_cZ_0$). The value of $R_c$ is not at all critical, a 15 percent variation being easily tolerated. Variations in $R_c$ may be compensated for by the angular adjustment of the coupling loop L.

However, once the assembly is adjusted, it is essential that $R_c$ remain constant. (This also applies to all of the other embodiments and modifications of the invention which also may require a very close tolerance on $R_c$ or its equivalent, i. e., the "reflectionless" load or detector of the devices illustrated in Figs. 5 and 6).

The devices illustrated in Figures 3(a) and 3(b) are similar in all respects to the devices described in Figures 2(a) and 2(b) respectively, with the exception that the second transmission line 6, 7 is not coaxial but comprises a cylindrical outer conductor 7 having a central shielding partition 9 separating and shielding the inner conductor 6 from the resistor $R_c$, as shown in the cross-sectional view of Figure 4. These features provide improved measurement accuracy of standing waves at the higher frequencies, due to the elimination of spurious coupling between the second line conductor 6 and the resistor $R_c$.

Referring to Figure 5, an alternative embodiment of the invention especially suitable for very high frequencies comprises a first transmission line including an inner conductor 1 and a concentrically disposed outer conductor 5, having a bearing 8 adapted to receive a cylindrical conducting shell 10. The end of the cylindrical conducting shell 10 remote from the bearing 8 supports a second transmission line comprising an inner conductor 6 and an outer conductor 7 concentrically disposed therewith. The inner conductor 6 of the second transmission line is terminated at one end to the outer conductor 7 thereof through the resistor $R_c$ which must substantially match the line. The remaining end of the second transmission line is terminated by the indicator 4 which need not be reflectionless.

The coupling inductor L comprises a closed loop disposed within the cylindrical conductive shell 10 having adjustable inductive coupling to the inner conductors 1 and 6 of the two transmission lines. Adjustment of this coupling is accomplished by rotating the cylindrical sleeve (and hence the second transmission line 6, 7 and coupling inductor L) within the bearing 8, as described heretofore for the embodiments of the invention described in Figures 2 and 3. The coupling capacitance C, therefore, is represented by series-connected capacitors $C_1$ (representing the capacitance between the inner conductor 1 of the first transmission line 1, 5 and the coupling loop L) and a second capacitance $C_2$ (representing the capacitance between the inner conductor 6 of the second transmission line 6, 7 and the coupling inductor L). In some cases, the coupling resistor $R_L$ may be omitted, or it may be connected across the coupling inductor L at a point intermediate the inner conductors 1, 6 of the first and second transmission lines.

The operation of the device is in all respects similar to the operation of the devices described in Figures 2 and 3, whereby forward-traveling waves on the first transmission line 1, 5, may be measured when the second transmission line 6, 7, is in the position illustrated in the drawing, and wherein backward-traveling waves on the first transmission line 1, 5 may be measured by rotating the second transmission line 6, 7 and the coupling inductor L through an angle of 180° in the bearing 8.

Figure 6 is similar to the device of Figure 5 with the exception that simultaneous measurements of forward and backward traveling waves upon the first transmission line 1, 5, may be made by employing two separate wave detectors and indicators 4, 4' respectively. The wave detectors should be substantially reflectionless and should be matched to and connected at opposite ends of the second transmission line 6, 7. The second line should have a surge impedance corresponding to the value of the resistor $R_c$ in the device described in Figure 5.

After preliminary adjustment of the orientation of the coupling inductor L with respect to the inner conductor 1 of the first transmission line 1, 5, by rotating the coupling assembly comprising the second transmission line 6, 7, and the inductor L within the bearing 8, the forward-traveling waves on the first transmission line 1, 5 may be indicated upon one indicator and the backward-traveling waves upon the first transmission line may be indicated simultaneously upon the other indicator. The surge impedance $R_c$ of the second transmission line 6, 7 completes the circuit for each of the wave indicators as described heretofore with respect to Figure 1.

It should be understood that the coupling inductor L in the devices of Figures 5 and 6 may be constructed and supported in any convenient manner within the cylindrical conductive shell 10 which interconnects the outer conductors 5, 7 of the first and second coaxial transmission lines, respectively. If the length of the coupling inductor loop L is an appreciable fraction of the operating wavelength, the resistor $R_L$ either should be omitted, or should be replaced by two separate resistors located adjacent each coupling end of the loop.

Each of the embodiments of the invention described herein will provide wave magnitude indications wherein the wave detector sensitivity increases substantially linearly with frequency. If desired, the detector sensitivity may be made substantially constant over a wide frequency range by connecting an inductive reactance, such for example, as a choke coil $L_1$ in series with the wave detector.

Thus the invention described comprises several modifications of an improved reflectometer for measuring the magnitudes of standing waves in a high-frequency transmission system, wherein said measurements are substantially independent of operating frequency and wherein simultaneous measurements of forward and backward-traveling waves are directly obtainable without the use of longitudinally movable wave probes. The invention may be employed to measure traveling wave magnitudes in either direction on all types of open, coaxial and waveguide transmission lines.

We claim as our invention:

1. Apparatus for measuring standing waves on a radio frequency transmission line including indicating means, and common lumped adjustable directional means coupled to said transmission line and providing fixed capacitive and adjustably directional inductive coupling between said line and said indicating means, and means for adjusting the directional characteristics of said inductive coupling to provide an indication of the magnitude of waves traveling in a predetermined direction on said line.

2. Apparatus for measuring standing waves on a radio frequency transmission line including indicating means, common lumped directional means providing fixed capacitive and adjustably directional inductive coupling between said line and said indicating means to provide a first indication of the magnitude of forward-traveling waves on said line and means for adjusting said directional characteristics of said inductive coupling to provide on said indicating means a second indication of the magnitude of backward-traveling waves on said line.

3. Apparatus for measuring standing waves on a transmission line including an indicator, common lumped directional means providing adjustably directional inductive and fixed capacitive couplings between said transmission line and said indicator to provide a first indication of the magnitude of forward-traveling waves on said line, and means for adjusting the phase of said inductive coupling to provide a second indication of the magnitude of backward-traveling waves on said line.

4. Apparatus for measuring standing waves on a coaxial transmission line including an indicator common lumped non-frequency selective directional means providing adjustably directional inductive and fixed capacitive couplings between said transmission line and said indicator to provide a first indication of the magnitude of forward-traveling waves on said line, and means for adjusting the phase of said inductive coupling to provide a second indication of the magnitude of backward-traveling waves on said line.

5. Apparatus for measuring standing waves on a coaxial transmission line including an indicator, common lumped non-frequency selective directional means providing adjustably phased inductive and fixed capacitive couplings between said transmission line and said indicator to provide a first indication of the magnitude of forward-traveling waves on said line, and means for adjusting the phase of said inductive coupling to provide a second indication of the magnitude of backward-traveling waves on said line.

6. Apparatus for measuring standing waves on a coaxial transmission line including an indicator, common lumped non-frequency selective directional means providing adjustable inductive and fixed capacitive couplings between said transmission line and said indicator to provide a first indication of the magnitude of forward-traveling waves on said line, and means for reversing the phase of said inductive coupling to provide a second indication of the magnitude of backward-traveling waves on said line.

7. Apparatus for measuring standing waves on a coaxial transmission line including an indicator, common lumped non-frequency selective directional means providing shunt-connected adjustably phased inductive and fixed capacitive couplings between said transmission line and said indicator to provide a first indication of the magnitude of forward-traveling waves on said line, and means for adjusting the phase of said inductive coupling to provide a second indication of the magnitude of backward-traveling waves on said line.

8. Apparatus for measuring standing waves on a coaxial transmission line including an indicator, common lumped non-frequency selective directional means including a second transmission line and a coupling loop and at least one resistor terminating said second line, means connecting said indicator to said second line, said loop and said second line providing inductive and capacitive couplings between said coaxial transmission line and said indicator to provide a first indication of the magnitude of forward-traveling waves on said line, and means for adjusting the phase of said inductive coupling to provide a second indication of the magnitude of backward-traveling waves on said line.

9. Apparatus of the type described in claim 8 including at least one shunt resistor connected across said coupling loop.

10. Apparatus for measuring standing waves on a coaxial transmission line including an indicator, common lumped non-frequency selective directional means including a second transmission line and an aperiodic coupling loop and at least one resistor terminating said second line, means connecting said indicator to said second line, said loop and said second line providing inductive and capacitive couplings between said coaxial transmission line and said indicator to provide a first indication of the magnitude of forward-traveling waves on said line, and means for adjusting the phase of said inductive coupling to provide a second indication of the magnitude of backward-traveling waves on said line.

11. Apparatus of the type described in claim 8 including means shielding said loop from said line terminating resistor.

12. Apparatus for measuring standing waves on a coaxial transmission line including an indicator, common lumped non-frequency selective means including a reactive network providing inductive and capacitive couplings between said line and said indicator to provide a first indication of the magnitude of forward-traveling waves on said line, and means for rotating said network with respect to said line for reversing said inductive coupling to provide a second indication of the magnitude of backward-traveling waves on said line.

13. Apparatus of the type described in claim 2 including a resistance terminating said reactive network.

14. Apparatus for measuring standing waves on a coaxial transmission line including an indicator, common lumped non-frequency selective directional means including a second transmission line and a coupling loop coupled between said lines, means connecting said indicator to said second line, said loop and said second line providing inductive and capacitive couplings between said coaxial transmission line and said indicator to provide a first indication of the magnitude of forward-traveling waves on said line, and means for adjusting the phase of said inductive coupling to provide a second indication of the magnitude of backward-traveling waves on said line.

15. Apparatus for measuring standing waves on a coaxial transmission line including an indicator, common lumped non-frequency selective adjustable directional means including a second transmission line and a coupling loop coupled between said lines, a second indicator, means connecting said indicators to opposite ends of said second line, said loop and said second line providing adjustably directional inductive and fixed capacitive couplings between said transmission line and said indicators to provide a first indication of the magnitude of forward-traveling waves on said lines, and to provide a second indication of the magnitude of backward-traveling waves on said line.

16. Apparatus according to claim 1 including an inductive impedance element serially connected between said directional means and said indicating means for compensating said wave magnitude indication for variations in coupling between said line and said directional means over a predetermined frequency range.

17. Apparatus according to claim 1 including an inductive reactor serially connected between said directional means and said indicating means for compensating said wave magnitude indication for variations in coupling between said line and said directional means over a predetermined frequency range.

CARL G. SONTHEIMER.
NATHANIEL I. KORMAN.

REFERENCES CITED

The following references are of record in the file of this patent:

UNITED STATES PATENTS

| Number | Name | Date |
| --- | --- | --- |
| 2,365,207 | Moles | Dec. 19, 1944 |